United States Patent
Wood, Jr.

[15] 3,693,999
[45] Sept. 26, 1972

[54] RACK AND PINION STEERING ASSEMBLY

[72] Inventor: Ruey E. Wood, Jr., Eastlake, Ohio

[73] Assignee: TRW Inc., Cleveland, Ohio

[22] Filed: May 4, 1970

[21] Appl. No.: 34,156

[52] U.S. Cl. ............... 280/95, 280/962 A, 287/85 A, 287/87
[51] Int. Cl. ........................ B62d 3/12, F16c 11/08
[58] Field of Search..... 280/95, 96.2 A; 287/90 R, 90 C, 287/85 A, 87

[56] References Cited

UNITED STATES PATENTS

| | | | |
|---|---|---|---|
| 2,993,716 | 7/1961 | Langen | 287/90 C |
| 3,113,787 | 12/1963 | Lauderdale | 280/95 |
| 2,974,975 | 3/1961 | Thomas | 280/95 |
| 2,718,418 | 9/1955 | Latzen | 287/90 C |
| 3,413,023 | 11/1968 | Herbenar | 287/90 A X |
| 3,411,815 | 11/1968 | Sullivan, Jr. | 287/90 A X |
| 3,197,842 | 8/1965 | Parker | 287/90 R X |

FOREIGN PATENTS OR APPLICATIONS

| | | | |
|---|---|---|---|
| 914,575 | 1/1963 | Great Britain | 280/96.2 A |
| 478,294 | 11/1951 | Canada | 287/85 A |

Primary Examiner—Benjamin Hersh
Assistant Examiner—John P. Silverstrim
Attorney—Hill, Sherman, Meroni, Gross & Simpson

[57] ABSTRACT

A rack and pinion steering assembly for automobiles and the like dirigible wheel equipped vehicles having a longitudinally driven rack bar connected to wheel turning tie rod linkage by plastic bearing ball and socket joints which are greased for life, automatically take-up wear, minimize transfer of road shock to the rack bar, prevent transfer of twisting loads to the rack bar, will maintain a predetermined load torque during articulation, and do not require induction hardened ball studs. The preferred plastic bearing for the ball and socket joint has a plastic cup part between the ball end of the stud and the rack bar composed of a plastic which has a high resilience and a low coefficient of friction. A second bearing part composed of a plastic ring envelopes the ball end of the ball stud opposite the cup bearing and is stiff with a high resistance to flow under load and also having a low coefficient of friction. A housing preloads the two bearing parts around the stud head compressing the resilient bearing cup so that it may expand as wear develops during use thereby preventing looseness in the joint. The joint housing is preferably in the form of a tube which is easily and inexpensively attached to the end of the rack bar.

12 Claims, 8 Drawing Figures

PATENTED SEP 26 1972

INVENTOR.
RUEY E. WOOD, JR.

BY Hill Sherman Meroni Gross Simpson
ATTORNEYS

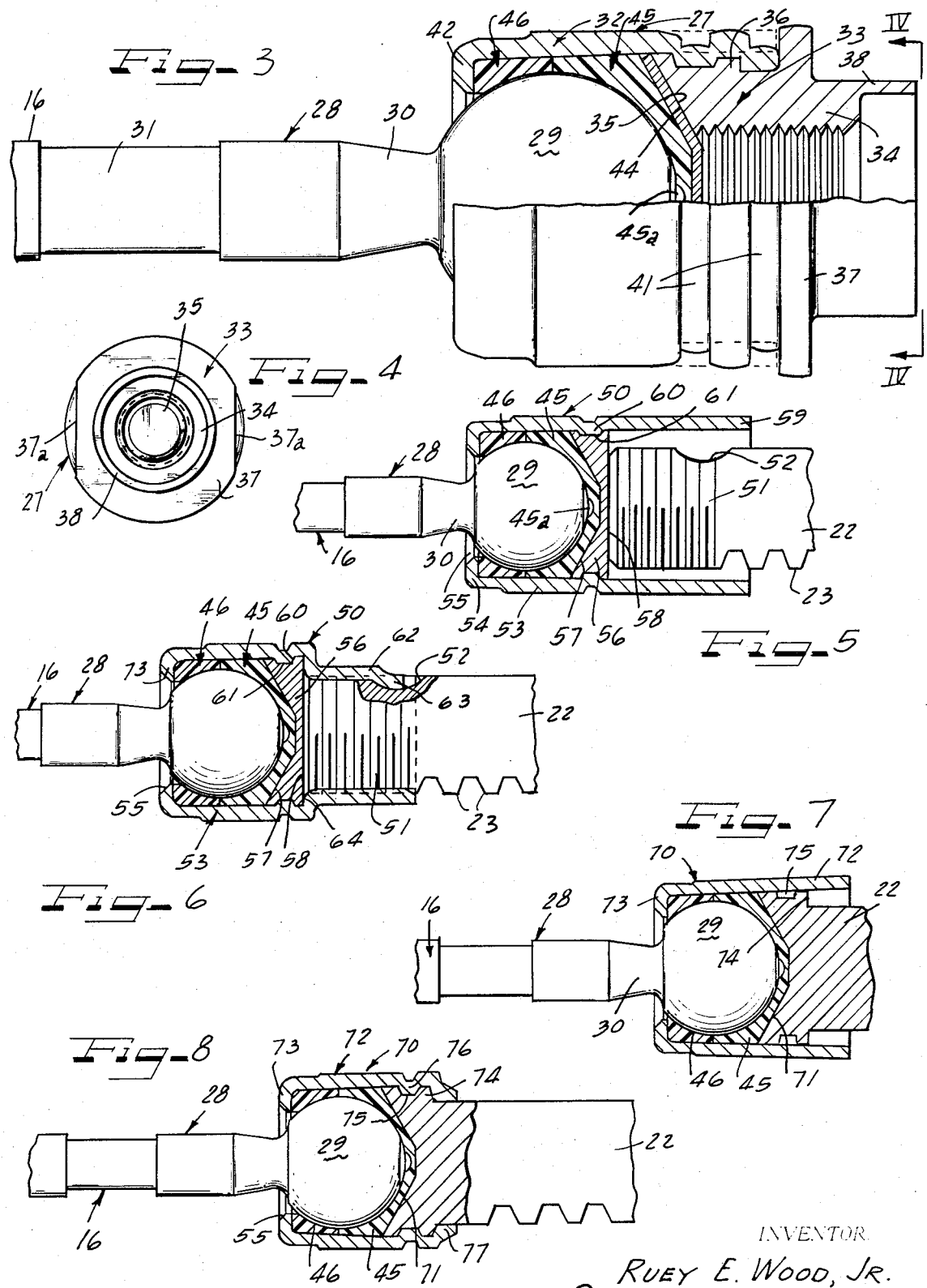

RACK AND PINION STEERING ASSEMBLY

BACKGROUND OF THE INVENTION

1. Field of the Invention

This invention relates to the art of steering assemblies for automotive and the like vehicles and particularly to rack and pinion steering assemblies with plastic bearing type ball and socket joints connecting the rack bar to tie rod wheel turning linkage.

2. Prior Art

Heretofore rack and pinion steering assemblies have had the rack bar connected to tie rods by means of pin type universal couplings. Attempts to use ball and socket joint couplings have not been successful because of excessive wear between the ball stud and the socket bearing wall and also because of the excessively high unit pressure loads on rather low projected areas of bearing surface. Hardening of the bearing surfaces to better resist wear has resulted in brittle stud shanks which break rather easily under shock loads with disastrous results in the steering linkage. Attempts to take-up wear in the joint by means of spring loaded bearing seats and the like have not been successful because springs introduced end play or "softness" in the linkage and prevented positive steering reaction. On the other hand, attempted uses of very stiff wear take-up springs have introduced high torque loads on the ball stud subjecting the stud neck to high bending forces in operation with resulting early fatigue.

The pin type universal joints heretofore used are expensive, have low wear life, and transmit twisting or turning loads to the rack bar which will be absorbed by ball and socket joints where the stud can rotate in the socket.

SUMMARY OF THE INVENTION

The present invention now provides rack and pinion steering linkages with plastic bearing equipped ball and socket joints which will transmit longitudinal shifting movements of the rack bar of the assembly to the wheel turning tie rod linkages of the assembly while avoiding all of the deficiencies of heretofore used pin type universal joints or ball and socket joints. This invention provides a very successful inexpensive connecting joint between the rack bar and the tie rod which will dampen road shock without imparting end play or "softness" in the linkage, is greased for life, has automatic wear take-up to maintain a predetermined uniform torque load with low break away friction on the ball stud and is relatively inexpensive to produce.

According to this invention the ball and socket connecting joint between the tie rod linkage and the rack bar has an inexpensive metal tubular housing easily attached to the end of the rack bar, a ball stud with a full ball end in the tubular housing, a two-part plastic bearing enveloping ball end of the stud in the housing and a means for preloading the two-part plastic bearing around the stud head. One of the plastic bearing parts is interposed between the ball end of the stud and the rack bar and is in the form of a bearing cup which supports the main compression loads to transfer the steering action from the rack bar to the tie rod linkage. This load supporting bearing cup member is a low friction highly resilient plastic. Suitable plastics for this bearing cup are polyolefin resins such as high density ethylene copolymers and polypropylene copolymers. These resins have the ability to expand when compressed and will take up wear developed during the use of the joint.

The second bearing part is in the form of a ring surrounding the stud shank and having a fragmental spherical inner surface receiving the ball end of the stud adjacent the shank. This bearing part is composed of a plastic which is stiff by comparison with the bearing cup material but also has a low coefficient friction. Suitable plastics for this bearing ring part are polyamides such as nylon, acetal resins, and polyphenolene oxide resins.

It is then an object of this invention to provide a rack and pinion steering linkage for automotive and like vehicles having plastic bearing ball joints connecting the rack ends to the tie rod linkages of the assembly.

Another object of this invention is to provide rack and pinion steering linkages with plastic bearing equipped ball joints capable of transmitting steering movement without end play, while absorbing road shock and maintaining a constant turning torque under load throughout a long wear life.

Another object of this invention is to provide an inexpensive plastic bearing ball and socket joint between a rack bar and a tie rod of a rack and pinion steering linkage.

A still further object of this invention is to provide an inexpensive plastic bearing equipped ball joint easily attached to the end of a rack bar and to a tie rod for prolonged maintenance free usage in automotive steering linkages.

Other and further objects of this invention will be apparent to those skilled in this art from the following detailed description of the annexed sheets of drawings which form a part hereof and which show several embodiments of the invention.

BRIEF DESCRIPTION OF THE DRAWINGS

FIG. 3 is a further enlarged view of the ball and socket joint of FIG. 2, shown in elevation with portions broken away in longitudinal section;

FIG. 4 is an end view of the joint of FIGS. 2 and 3 taken along the line IV—IV of FIG. 3;

FIG. 5 is a fragmentary longitudinal sectional view with parts in elevation illustrating the application of another form of ball and socket joint according to this invention to the rack bar;

FIG. 6 is a view similar to FIG. 5 but showing the assembly after attachment of the ball and socket joint to the rack bar;

FIG. 7 is a view similar to FIG. 5 showing a still further embodiment of ball and socket joint according to this invention;

FIG. 8 is a view similar to FIG. 7 showing the finished mounting of the ball and socket joint on the rack bar.

DESCRIPTION OF THE ILLUSTRATED PREFERRED EMBODIMENTS

Figure 1:
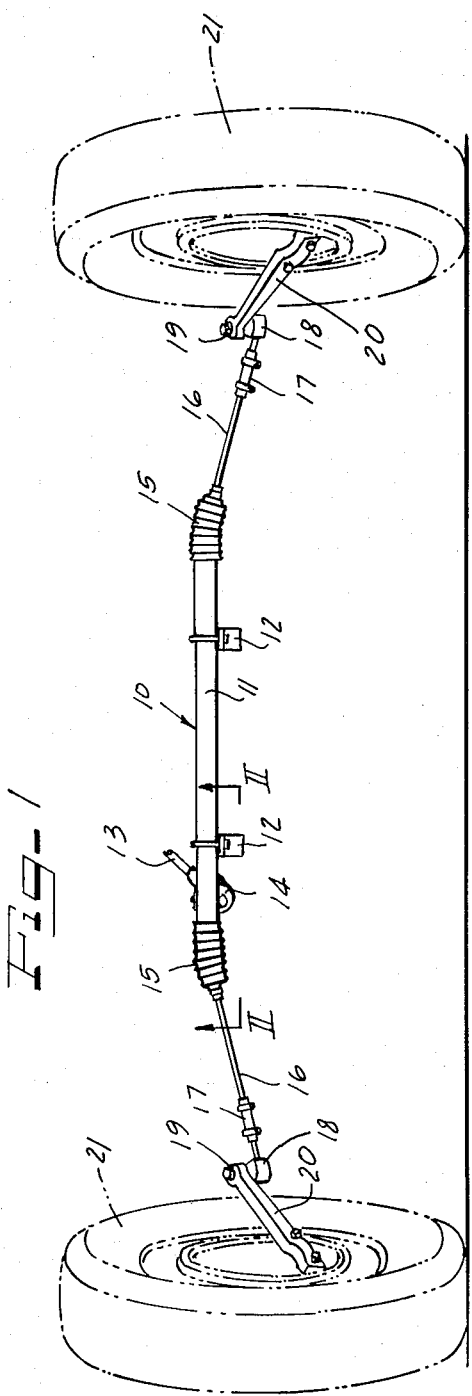
FIG. 1 is a diagrammatic isometric view of a rack and pinion steering linkage for automotive vehicles equipped with plastic bearing type ball and socket joints according to this invention.

In FIG. 1 the reference numeral 10 designates generally a rack and pinion steering linkage for automotive vehicles according to this invention. In FIG. 1 a rack and pinion housing in the form of an elongated tube 11 is mounted across the front end of an automobile as by means of mounting brackets 12,12. A steering shaft or column 13 from the steering wheel (not shown) enters a pinion housing 14 near one end of the tubular housing 11. Rubber bellows or boots 15,15 are secured to the ends of the housing 11 and to tie rods 16,16 which are connected through turn buckles 17,17 with the stems of tie rod joint housing 18,18 carrying studs 19,19 which are secured to the ends of steering arms 20,20 of the dirigible wheels 21,21. The arrangement is such that longitudinal shifting of a rack bar in the tubular housing 11 by rotation of the steering column 13 will push or pull the tie rods 16 to swing the steering arms 20 thereby causing the wheels 21 to turn.

Figure 2:
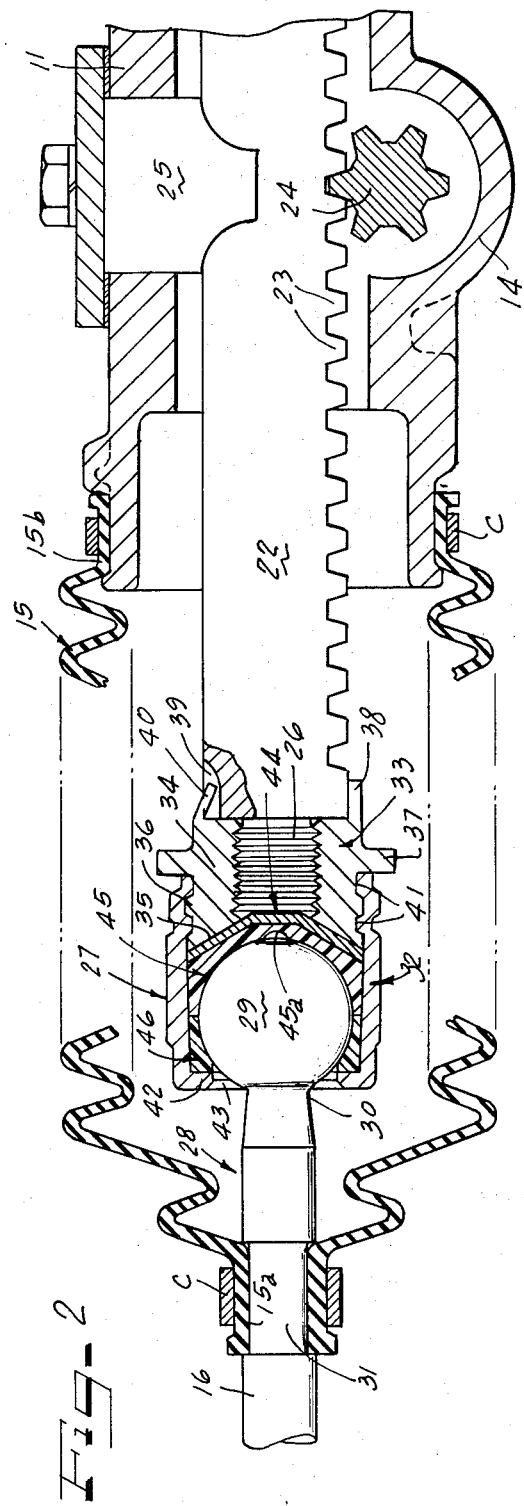
FIG. 2 is an enlarged fragmentary longitudinal sectional view of the linkage taken along the line II—II of FIG. 1.

As shown in FIG. 2, the rack and pinion steering unit has a longitudinally shiftable rack bar 22 mounted in the housing 11 with its rack teeth 23 engaged by a pinion 24 that is rotated by the steering shaft 13. A bearing saddle 25 carried by the housing slidably supports the rack bar 22 opposite the pinion 24 so that the teeth of the rack will remain meshed with the teeth of the pinion.

The ends of the rack bar 22 project beyond the ends of the housing 11 and as illustrated in FIG. 2 the terminal end of the rack bar 22 has a reduced diameter externally threaded stud portion 26 thereon.

According to this invention the tie rods 16 are connected to the ends of the rack bar 22 by means of plastic bearing equipped ball and socket joints 27. These joints have a ball stud 28 with a full ball end 29 and a stem projecting from the ball end that provides the tie rod 16. This tie rod stem 16 has a tapered neck portion 30 providing for the required degree of articulation and a reduced diameter portion 31 receiving the small neck end 15a of the rubber bellows 15. The large neck end 15b of this bellows is received on the end of the housing 11 and clamps C lock the necks respectively to the tie rods 16 and the housing 11.

Joint 27 has a housing composed of a metal tube 32 and a metal adapter 33. This adapter is tubular and has a main internally threaded body portion 34 with a conically recessed outer end 35, a circumferential bead 36 adjacent this tapered end 35, a radially projecting head flange 37 beyond the bead 36 and a relatively thin collar portion 38 at the end thereof opposite the tapered recessed end. The head 37 has flats 37a for engagement by a wrench as shown in FIG. 4.

The internal threads of the body 34 mate with the externally threaded on this stud to be bottomed against the shoulder at the end of the rack bar with the collar portion 38 overlying the end of the rack bar. The end of the rack bar has a key slot 39 and a portion of the thin collar 38 of the adapter is depressed at 40 into this key slot for locking the adapter to the rack bar.

The tubular sleeve part 32 has an open end disposed around the adapter which is radially pressed at both sides of the bead 36 to provide inwardly projected ribs 41 straddling the bead 36 and fixedly locking the tube 32 to the adapter 33. The opposite end of the tube 32 has a radially inturned flange 42 surrounding a circular reduced diameter opening 43 sufficiently large to freely accommodate the neck 30 of the ball stud 28 so as not to interfere with wide angle tilting of the stud relative to the housing.

A dished metal closure disc 44 rests on the tapered end face 35 of the adapter 33 in the housing 32 and has a flat bottom portion spanning the threaded hole through the adapter.

The ball end 29 of the stud 28 is enveloped by two plastic bearing members 45 and 46 in the housing 32. The member 45 is in the form of a closed bottom cup with a hemispherical interior sized for receiving the ball end 29 of the stud, a cylindrical side wall press fit in the tubular housing 32 and a tapered bottom fitting the closure disc 44. A recess 45a is provided in the bottom to form a well or pocket for lubricant.

The plastic bearing member 46 is in the form of a continuous ring with a fragmental spherical inner wall sized for receiving that portion of the ball end 29 adjacent the neck 30, a cylindrical side wall press fitting in the tubular housing 32 and flat end faces respectively bottomed on the inturned flange 42 and on the adjacent end rim of the cup member 45.

The ring member 46 thus has one end about level with the equator of the ball end 29 and an opposite end bottomed on the flange 42 with the opening therethrough substantially mating with the opening 43 in the flange 42.

The bearing cup 45 is composed of a high density but resilient plastic material having a low coefficient of friction and capable of being compressively loaded with elastic memory to regain its free state size and shape. Suitable plastics for this ring are high density polyolefins such as "Marlex" sold by Phillips Chemical Company and including high density ethylene copolymers and polypropolene copolymers. Other suitable ethylene copolymer materials for the bearing cup 45 are "Alathon" sold by DuPont, "Forti-Flex" sold by Celanese Plastics Company and the like materials characterized by stiffness, resistance to environmental stresses and heat resistant but still having a degree of resilience and good elastic memory.

The ring bearing member 46 is composed of a rather stiff load carrying plastic material having a low coefficient of friction and a low cold flow factor. The material should provide a stable high tensile load support and polyamide type plastic materials have been found especially useful. Examples of such materials are nylon resins sold under the trademark "ZYTEL" by DuPont, acetal resin sold under the trademark "DELRIN by DuPont, polyphenylene oxide resins sold under the trademarks "PPO" and "NORYL" by General Electric Company and the like.

The tubular housing member 32 with the stacked closure disc 44, bearing cup 45 and bearing ring 46 therein is pressed onto the adapter 33 to firmly bottom the closure disc 44 on the conical end 35 of the adapter and to compressively load the plastic bearing parts 45 and 46 to a predetermined degree. This preloading of the assembly compresses the bearing cup 45 establishing a desired torque resistance for movement of the ball end in the bearing assembly. When the desired preload has been established the end of the tube is swedged over the bead 36 of the adapter to firmly lock the tube to the adapter and thereby providing an assembly with a fixed preload on the ball stud. This assembly is then easily applied to the threaded end of the rack bar and locked on the rack bar by depressing a localized portion 40 of the collar 38 into the key way 39.

The initial assembly of the stacked components in the tubular housing part 32 can include sufficient lubricant to accommodate low break away of movement of the ball end 29 in the socket and to provide a greased for life joint. Should it become necessary to replace the joint assembly, however, it can be easily removed by lifting the key portion 40 out of the key way 39 and unthreading the adapter from the end of the rack bar.

The stiff and relatively incompressible plastic bearing ring 46 supports tension loads between the rack bar end 22 and tie rod 16 while the compressed bearing cup 45 supports compression loads between these two parts. Both tension and compression loads are transmitted without loss of steering since the preload on the joint assembly prevents any end play or looseness.

It will be understood that the tie rods 16 can rotate about their own axes without transmitting any twisting loads to the rack bar 22. In addition the tie rods 16 can tilt relative to the rack bar 22 in all directions throughout a wide angular range. Because the ball end 29 is substantially completely enveloped in special plastic bearing material, road shocks on the wheels are not transmitted to the rack bar 22 in the same sense as occurs in universal couplings and the like metal to metal joints that have been used heretofore.

While the tubular housing 32 is illustrated as being bottomed on the head flange 37 of the adapter it will be appreciated that prior to the deformation of the end of the tube around the bear 36, the tube end will be spaced from this head 37 so as not to interfere with the desired preloading of the components in the tube as illustrated in dotted lines in FIG. 3.

In FIGS. 5 and 6, a modified ball and socket joint 50 is illustrated and parts substantially identical with and functioning in the same way as parts described in connection with the joint 27 of FIGS. 1 to 4 have been marked with the same reference numerals. In the arrangement of FIGS. 5 and 6, however, the rack bar 22 has a threaded end 51 of the same diameter as the bar and with a key slot 52 in this threaded end.

The housing for the joint is an elongated metal tube 53 with an inturned radial flange 54 at one end surrounding a circular opening 55 freely accommodating the neck 30 of the stud 38 therethrough.

A closure plate 56 fits in the tube and has a dished end face 57 receiving the bearing cup 45. This closure plate 56 has a flat end wall 58 opposite the end face 57.

The tube 53 is initially provided with a straight cylindrical open end 59 as shown in FIG. 5 which is larger than the rack bar 22, being of the same internal diameter as the outer peripheries of the plastic bearing members 45, 46 and the closure disc 56.

The stacked components in the open end tube are preloaded as described above in connection with the joint 27 and the tube is swedged to form an internal rib 60 seated in a peripheral groove 61 of the closure plate 56. This firmly locks the closure plate to the tube and holds the parts in preloaded condition. Then in addition, the portion of the tube beyond the rib 60 is swedged to a reduced diameter for fitting the threaded end 51 of the rack bar. The reduced collar portion 62 is internally threaded to receive the threaded end 51 of the rack bar and a localized portion 63 is depressed into the key-way 52 of the rack bar. In addition a shoulder 64 is formed overlying the closure plate 56.

The reduction of the end 62 of the tube can take place on the rack bar to form an integrated assembly or the tube end 62 may be initially formed and internally threaded to be later mounted on the threaded end of the rack bar.

FIGS. 7 and 8 illustrate a further modified ball and socket connection 70 between the rack bar 22 and the tie rod 16. In this modified arrangement the rack bar has a conically recessed end wall 71 directly seating the bearing cup 45. A tubular housing 72 is provided with the radially inturned flange 73 at one end accommodating the neck 30 of the stud 28. The housing, as shown in FIG. 7 has a somewhat tapered side wall with an open end fitting over the end of the rack bar 22 which has a head portion 74 with a peripheral groove 75 therearound and with the tube snugly engaging this head portion 74. The tube 72 is pushed onto the head portion 74 to preload the bearing components therein providing the desired load on the ball end 29. Then, as illustrated in FIG. 8 the free end of the tube 72 is swedged around the rack bar head 74 to provide a rib 76 in the groove 75 and an end wall 77 gripping the rack bar and providing another shoulder for locking the housing onto the rack bar.

In the joint 70 the housing 72 becomes an integral portion of the rack bar intended for permanent assembly throughout the entire life of the rack and pinion unit.

From the above descriptions it should be therefore understood that this invention provides preloaded plastic bearing equipped ball and socket joints forming articulated connections between the rack bar and the tie rods of a rack and pinion steering assembly and eliminating heretofore encountered problems of wear, road shock transmission, lost steering motion, and maintenance while reducing the cost of the connections.

I claim as my invention:

1. In a rack and pinion steering assembly for dirigible wheels having a pinion driven longitudinally shiftable rack bar and tie rods connecting the rack bar and wheels, the improvement of ball and socket joints uniting the rack bar and tie rods effective to dampen road shock from the wheels to the rack bar and to maintain constant turning torque, said joints each having a ball stud with a ball end enveloped by a two-part plastics material bearing providing a ball seat accommodating tilting and rotation of the stud relative to the rack bar, one part of said two-part bearing being positioned between the ball head and tie rod, the other part of said two-part bearing being positioned between the ball head and the rack bar, said one part supporting tension load and being composed of a stiff plastics material having a low coefficient of friction and a high resistance to cold flow, said other part supporting compression loads and being composed of a resilient plastic having a low coefficient of friction, and rigid non-yielding means preloading said bearing parts around said ball end of the stud to compress and fully confine the resilient plastic whereby wear will be taken up by expansion of the compressed resilient material, road shock will be absorbed and lost steering motion will be avoided.

2. The rack and pinion assembly of claim 1 wherein the stiff plastic bearing part is composed of a plastics material selected from the group consisting of nylon, acetyl resins, polyethylene oxide resins, and said resilient plastic part is composed of a plastics material selected from the group consisting of high-density olefin co-polymers.

3. The rack and pinion assembly of claim 1 wherein said one bearing part is an annulus receiving the stud shank therethrough and the other bearing part is a cup surrounding the free end of the ball end of the stud.

4. The assembly of claim 1 wherein said one bearing part is a high-strength rigid resin and said other bearing part is a resin having an elastic memory.

5. The assembly of claim 1 wherein said bearing parts are pressed into thin-walled housings attached to both ends of the rack bar.

6. A rack and pinion assembly comprising a longitudinal shiftable rack bar, a pinion driving said rack bar, housings secured to both ends of the rack bar, a two-piece plastic bearing in each housing, a tie rod having a ball end in each housing in bearing engagement with the two-piece plastic bearing therein for transmitting shifting movement of the rack bar to the tie rods while accommodating relative tilting movements therebetween, one part of each bearing supporting tension loads and being composed of a high-strength rigid plastic, the other part of each bearing being composed of a resilient plastic with an elastic memory, and rigid non-yielding means preloading said bearing around the ball end of the ball stud to maintain tight non-shifting bearing engagement therewith.

7. In a rack and pinion steering gear having a rack bar, the improvement of a ball and socket joint on an end of the rack bar which comprises a stud having a ball end, a pair of plastic bearings surrounding said ball end, a tubular housing enveloping said plastic bearings, a rigid closure plate in the tubular housing bottomed on one of the plastic bearings, an internally threaded adapter threaded on the rack bar end and bottomed on the closure plate in said tubular housing to form a non-yielding backing for the rigid closure plate, and coacting rib and bead means on the adapter and tubular housing locking the housing to the adapter and maintaining a predetermined load on the plastic bearings, one of said bearings being resiliently compressible and having an elastic memory.

8. In a rack and pinion steering assembly having a rack bar, a ball and socket joint on an end of said rack bar which comprises a ball stud having a ball end, a pair of plastic bearings enveloping said end, a tube enveloping said bearings, a rigid non-yielding closure plate in said tube, one end of said tube having an in-turned flange bottoming one of said bearings, said closure plate bottoming the other of said bearings, and coacting groove and rib means on the tube and closure plate locking the plate to the tube to confine and maintain a predetermined load on the plastic bearings, one of said bearings being compressed in the tube and having an elastic memory adapted to maintain the preload on the ball end.

9. The assembly of claim 6 wherein each housing has a tube portion with an in-turned end flange surrounding the tie rod, and said preloading means comprising an internally threaded adapter receiving the end of the rack bar locked in the other end of the tube and coacting with the end flange.

10. The assembly of claim 6 wherein each housing has a tube portion, said preloading means comprising an adapter portion secured to said tube portion and preloading the joint components.

11. The assembly of claim 10 wherein the adapter is an integral part of the rack bar.

12. A rack and pinion steering gear assembly having a longitudinally shiftable rack bar, a tie rod with a fixed integrally related ball end, a first plastics bearing ring surrounding the tie rod and embracing the portion of the ball end adjacent the tie rod, a second bearing cup embracing the portion of the ball end remote from the tie rod, said first bearing ring being composed of a stiff plastic selected from the group consisting of nylon, acetyl resins, and polyethylene oxide resins, said second bearing cup composed of a resilient plastic material selected from the group consisting of high density olefin co-polymers, and a non-yielding rigid housing secured to an end of the rack bar enveloping said first bearing ring and said second bearing cup and preloading the ring and cup around the ball end whereby lost motion between the rack bar and tie rod is eliminated and shock loads between the tie rod and rack bar will be absorbed.

* * * * *